Aug. 9, 1949.                    E. C. FRITTS                    2,478,384
                    CONTROL DEVICE FOR PROJECTION PRINTERS
Filed Jan. 12, 1946                                        3 Sheets-Sheet 1
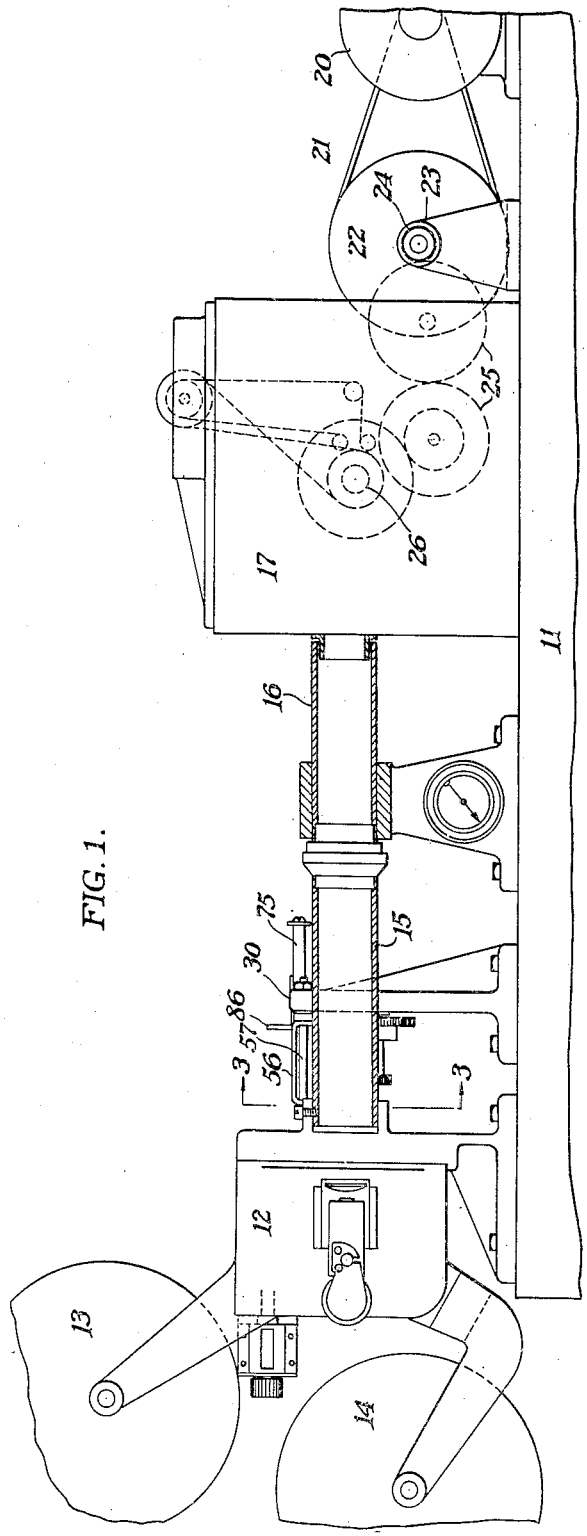
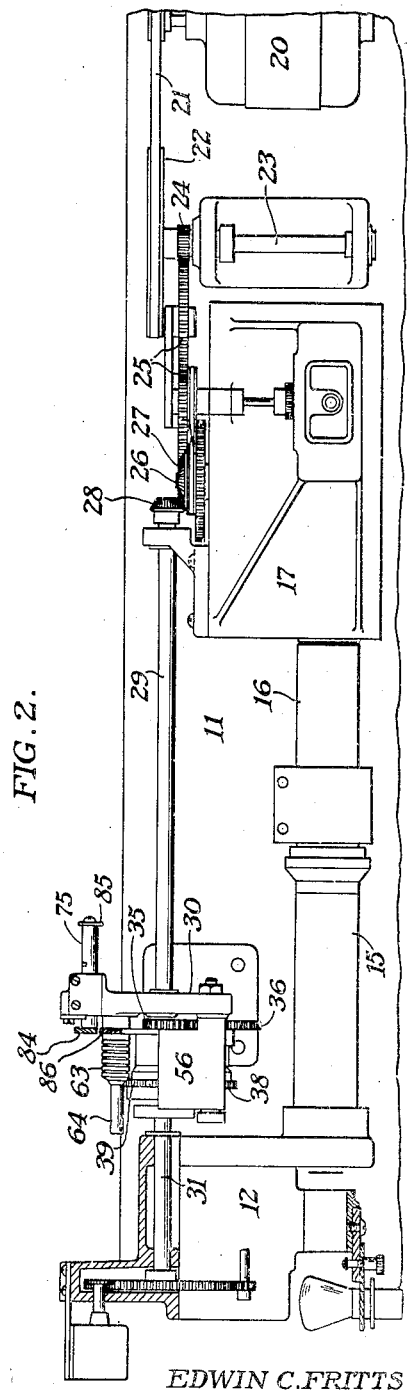
EDWIN C. FRITTS
INVENTOR
BY
ATTORNEYS

EDWIN C. FRITTS
INVENTOR

Aug. 9, 1949.     E. C. FRITTS     2,478,384
CONTROL DEVICE FOR PROJECTION PRINTERS
Filed Jan. 12, 1946     3 Sheets-Sheet 3

EDWIN C. FRITTS
INVENTOR

BY
ATTORNEYS

Patented Aug. 9, 1949

2,478,384

UNITED STATES PATENT OFFICE 2,478,384

CONTROL DEVICE FOR PROJECTION PRINTERS

Edwin C. Fritts, Rochester, N. Y., assignor to Eastman Kodak Company, Rochester, N. Y., a corporation of New Jersey Application January 12, 1946, Serial No. 640,710

5 Claims. (Cl. 88—24)

The present invention relates to photography, and more particularly to a control device for a projection printer.

The invention has as its principal object the provision of a control device which permits the making of a number of successive prints on a duplicate film from a single image area of an original film strip.

Another object of the invention is the provision of a control device by which the number of prints to be made may be selected.

Still another object of the invention is the provision of a device of the class described which is adjustable so as to vary the number of prints made from different image areas of the original film strip.

Yet another object of the invention is a control device which is simple in construction, easy to adjust and operate, rugged, and accurate in its operation.

To these and other ends, the invention resides in certain improvements and combinations of parts, all as will be hereinafter more fully described, the novel features of the invention being pointed out in the claims at the end of the specification.

In the drawings:

Fig. 1 is a side view of a projection apparatus, and with parts in section, showing the relation thereto of the control device of the present invention;

Fig. 2 is a plan view of the apparatus and the control device of the present invention;

Similar reference numerals throughout the various views indicate the same parts.

Figure 3:
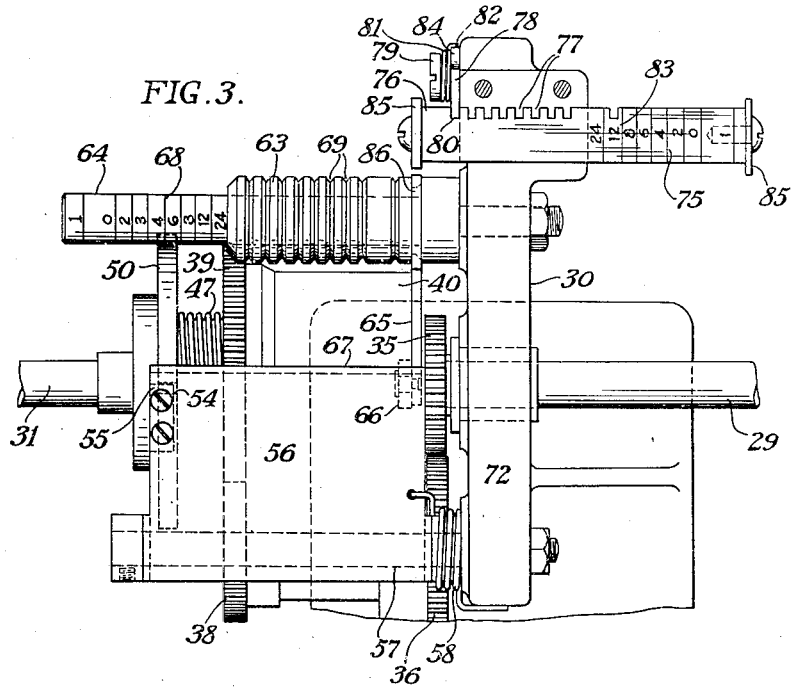
Fig. 3 is a plan view of the control device constructed in accordance with the preferred embodiment of the present invention, showing the relation of the various parts.

The printer of the present invention is designed to produce from a motion picture film, preferably 16-mm., a duplicate film in which certain frames of the original film may be represented by a multiplicity of consecutive frames in the print or duplicate. Thus each of the certain image areas of the original is "stretched out" into a plurality of frames in the duplicate. This multiplicity may be 2, 3, 4, 6, 8, 12 or 24, according to the adjustment of the control device, as will be later described.

The apparatus consists fundamentally of a projector head which is a modified motion picture projector through which the original film strip, with its separate image areas, is adapted to be moved intermittently to bring the various image areas into projecting position. These image areas are projected onto a sensitized film carried by a camera positioned in optical alignment with the projector. The drive means for the camera is connected through the control device of the present invention to the drive means of the projector so that the camera and projector are driven in proper timed sequence. The control device is provided with a clutch controlled by a ratchet and pawl which, when the pawl is disengaged momentarily, connects the drive means of the projector to the drive means of the camera to cause the projector to advance one frame of the original film. The disengagement of the pawl is controlled by a lever fitted with a roller which rides on a series of pins carried by a drum rotating once for a very 24 frames in the camera. This lever, with its roller, may be moved along the axis of the drum to choose or select the series of pins to give the desired multiplicity of frames of the duplicate. It is also possible to place the lever at a zero position so that the camera alone is operated to permit the winding of the exposed film through the magazine. The lever may also be set to cause the projector head to run one frame of each frame of the film strip in the camera. The camera is provided with a film magazine, not shown, so that the printer need not be operated in a darkroom.

As the present invention relates only to the control device for varying or selecting the number of prints to be made from an image frame of the original, only so much of the projector and the camera mechanism will be disclosed as is necessary to a complete understanding of the present invention.

Figs. 1 and 2 show the projecting apparatus or printer to which the control device of the present invention is applied. These figures show a supporting base 11 on one end of which is mounted a projector 12 of any suitable construction provided with supply and take-up reels 13 and 14, respectively, for carrying the original film strip, not shown, which is adapted to be intermittently moved through the projector to bring the successive image areas into projecting position in alignment with the lens tube 15. The image areas on the original are projected by the lens tube 15 through a tube 16 to a camera 17, the lens of which has been removed. These successive image areas are recorded on a sensitized duplicate film strip, not shown, intermittently moved through the camera in a well-known manner.

The film moving means of the projector and camera are connected so that the various mechanisms move in proper timed sequence. To secure this result, a motor 20 is connected by a belt drive 21 to a pulley 22 carried by a shaft 23 on which is mounted a gear 24 which is connected through a suitable gear-train 25 to the main drive shaft 26 of the camera 17 to move the various mechanisms thereof. The shaft 26 carries a bevel gear 27 which meshes with a bevel gear 28 carried by the right end of shaft 29, the left end of which is connected through the control device, broadly designated in Fig. 2 by the numeral 30, to a shaft 31 which, in turn, is suitably connected to the main drive shaft of the projector 12 to operate the various mechanisms thereof. Thus, the drive means of the camera and the projector are connected through the shafts 29 and 31 and the control device 30 so that the film strips in the camera and the projector will be moved in proper timed relation.

In prior projection printers, each image area of the original was represented by a single frame in the duplicate or print. When this print is then projected, the time which an image area or frame thereof is on the screen is quite short, so that a particular frame cannot be carefully analyzed and/or studied. Of course, if it is desirable to so study such a frame, the projector can be stopped and the frame of the duplicate can be projected as a "still," as is well known. With such an arrangement, however, the projector must be provided with a suitable safety shutter to protect the film, as is common practice. In some cases, however, it is desirable to provide a relatively long period of inspection of a particular or selected single frame of the duplicate or prints without necessitating the stopping of the projector. In order to secure this result, it is desirable to provide a multiplicity of successive frames of a particular image area of the original duplicate or print. These multiplicity of frames of the duplicate print "stretch out" the time of projection of an image area of the original film, and thus permit close study and analysis. As various image areas in the original may not be of equal importance, it may be desirable to stretch out different images of the original to different various lengths in the duplicate. Furthermore, it is desirable to have such print variations under control of the operator during the printing operation.

To secure this result, the present invention provides a control device arranged in the drive to the projector so that the latter may be connected to the camera in such a way that the image areas in the projector are moved only at selected time intervals relative to the movement of the film in the camera. By means of this arrangement, a plurality or multiplicity of successive image areas may be made on a duplicate film in the camera of a single image area of the original film in the projector. Thus, the single image area in the original is stretched out into a plurality of successive reproductions of this area in the duplicate. The details of this control device are shown in Figs. 3 to 7 and will be hereinafter more fully described.

The left end of shaft 29 has mounted thereon a gear 35 which meshes with a gear 36 carried by a shaft 37 on which is also mounted a gear 38 meshing with a gear 39 connected to a control drum 40. Thus the drum 40 is operatively connected to and driven from the drive means of the camera 17 and in proper relation thereto. The drum 40 is rotatably supported on a sleeve or bushing 41 pinned to the shaft 29 at 42. The shaft 31 is in alignment with the shaft 29, and has the right end thereof supported in a small bushing 43 carried by the bushing 41. A hub 44 is pinned at 45 to the shaft 31 and is of equal diameter to and is arranged in alignment with a reduced end hub 46 of the bushing 41, see Fig. 7. A coil spring 47 is wrapped around the hubs 44 and 46 and has one end 48 bent radially and engaging in a hole 49 in hub 44 to assure permanence in the timing between the camera and the projector. A disk 50 is loosely mounted on a bushing 51 carried by hub 44 and has threaded thereinto a longitudinally extending pin 52 the free end of which engages the other bent end 53 of the coil spring 47.

Figure 7:
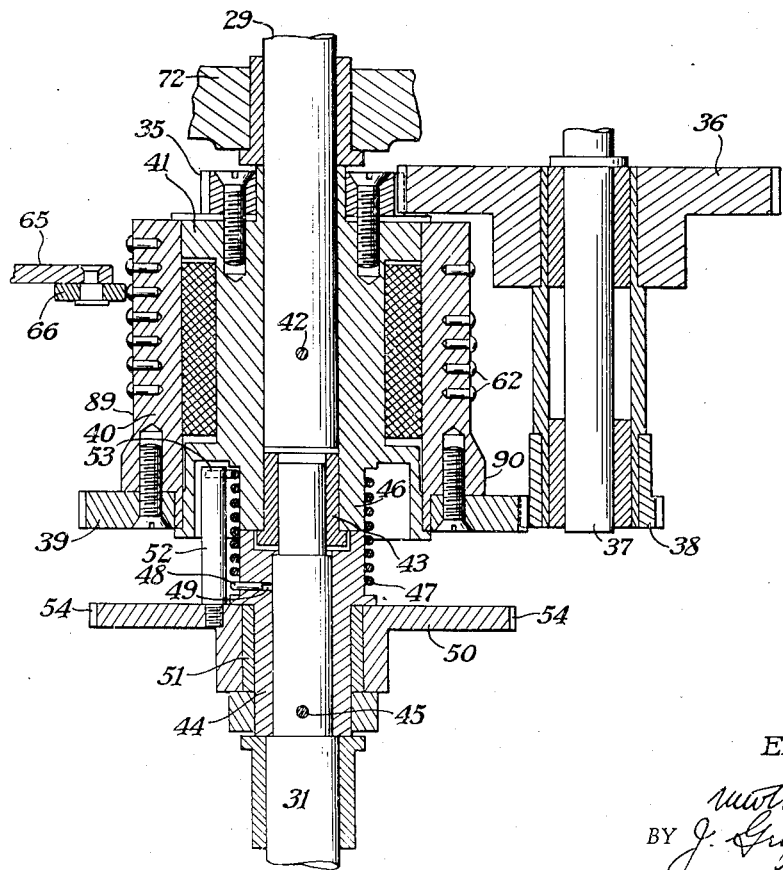
Fig. 7 is a vertical central view through the control drum shown in Fig. 4, showing the relation of the adjusting pins, the control roller, clutch and the driving means for the roller.

The spring 47 is wound to fit snugly on hubs 44 and 46, and, when the end 53 is not retarded by pin 52 attached to disk 50, it serves as a driving connection between the hubs 44 and 46 and thereby connects shafts 29 and 31 in driving relation, as will be later more fully described. Any retarding of the disk 50 from its free rotation, on the other hand, disengages spring end 53 from its gripping action on hub 46 and the shafts 29 and 31 are disconnected. Thus, whenever disk 50 is released, the two shafts 29 and 31 are mechanically connected and the projector will be operated to move the image areas of the original film into projecting position and in timed relation to the movement of the duplicate film strip through the camera. When, however, the disk 50 is held stationary, the driving relation between the shafts 29 and 31 is interrupted and the original film remains stationary in the projector. The film in the camera is, however, still moved by the driving mechanism which operates continuously. The spring 47 thus provides a releasable or disengageable clutch between the shafts 29 and 31. The adjacent ends of hubs 44 and 46 are given a slight clearance, as shown in Fig. 7.

Figure 6:
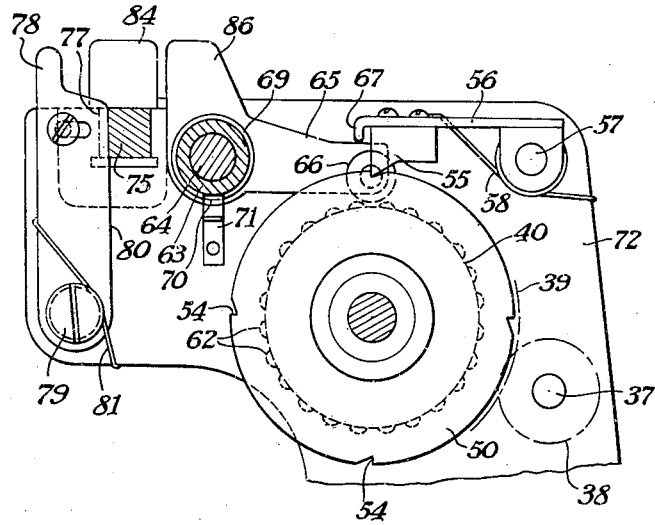
Fig. 6 is an end view of the device shown in Fig. 3, illustrating the relation of the clutch parts.

The disk 50 is provided with four evenly spaced peripheral notches 54 arranged to receive a pawl 55 carried by a plate 56 pivotally mounted at one edge on a shaft 57. A small spring 58 is wrapped around the shaft 57 and has one end secured to plate 56, as shown in Figs. 3 and 6, to hold the pawl 55 in engagement with the disk 50, as best shown in Fig. 6. It will be apparent that when the parts are in the position shown in Fig. 6, the disk 50 will be held against rotation by the pawl 55, and the spring 47 will be loose to disconnect the shaft 31 from the shaft 29 to render the driving mechanism of the projector inoperative. If, however, the plate 56 is rocked in a clockwise direction, as viewed in Fig. 6, the pawl 55 will be withdrawn from cooperating relation with notch 54 and the disk 50 will be free. The spring 47 will then become effective for mechanically connecting the shafts 29 and 31 to drive the projector to move the image areas of the original film strip thereto. Thus, so long as the pawl 55 engages in one of the notches 54, the pin 52 withholds the control spring 47, thus preventing movement of the shaft 31 and the drive mechanism of the projector. The withdrawal of the pawl 55, by means to be later described, releases disk 50 and the pin 52 to cause the spring 47 to connect shafts 31 and 29 to drive the projector and to move the next image area of the original film into projecting position.

Thus the pawl 55 and disk 50 are effective in connecting the projector to and disconnecting it from the drive means of the camera. In order, however, to enable various numbers of prints to be made on the duplicate film, the drum 40 is provided with rows of pins 62, as best shown in Fig. 7. The number of pins in each row is, however, so proportioned as to operate the pawl and ratchet the required number of times during each revolution of the drum 40 so as to operate the projector in the desired timed sequence. As mentioned above, the drum rotates once for each 24 frames in the camera. Therefore, in order to secure 24 prints from each image area, the right-hand row of pins 62, see Fig. 7, has only one pin so that the pawl and ratchet will be operated only once in each revolution of the drum 40, as will be later explained. Passing from the right to the left across the drum, the successive rows have 2, 3, 4, 6, 8, and 12 pins, and will, therefore, actuate the pawl and ratchet a corresponding number of times to provide 12, 8, 6, 4, 3, and 2 prints of the image areas of the original, depending on the particular row of pins selected.

Figure 4:
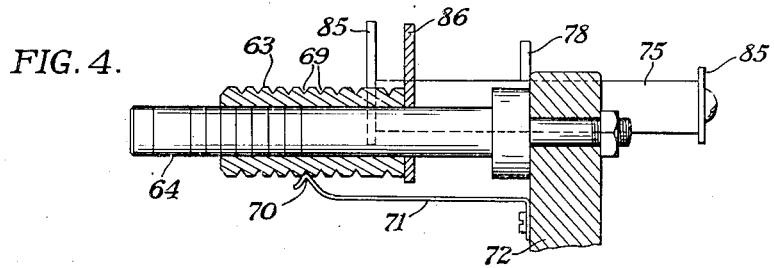
Fig. 4 is a fragmentary view of a part of the control device illustrated in Fig. 3, with parts in section, showing the means for maintaining the movable roller in its adjusted position.

In order that the pawl 55 may be actuated the desired number of times, the present invention provides a sleeve 63 slidable on a shaft 64 arranged parallel to the axis of the drum 40, as best shown in Figs. 3 and 4. This sleeve is provided with a radially extending arm 65 which projects over the drum 40 and has mounted on the free end thereof a roller 66 adapted to engage selectively one of the rows of pins 62, as shown in Figs. 3 and 7. This roller 66 is positioned below a turned down lip 67 on plate 56, as best shown in Fig. 6. It is now apparent that as the drum 40 rotates, the pins 62 will serve to momentarily raise the roller 66 to cause the latter to lift the free end of plate 56 to move or rock the latter about its shaft 57 to disengage the pawl 55 from the notch 54 of plate 50. Thus the pins 62 and the roller 66 provide a means for releasing the pawl and ratchet to permit the spring 47 to clutch the two shafts 29 and 31 together to operatively connect the projector to the drive means of the camera. The number of times the pawl and ratchet are disengaged depends, of course, on the number of pins 62 in the particular row with which the roller 66 registers.

In order that the number of actuations of the pawl and ratchet may be controlled so as to provide the desired multiplicity of successive prints in the duplicate, the roller may be moved across the drum so as to bring the rollers into registry with the proper selected row of pins. To secure this adjustment, the sleeve 63 is slidable axially along shaft 64 to properly position the roller 66 with the desired row of pins 62. To facilitate such an adjustment, the shaft 64 may be provided with a suitable scale 68 calibrated in terms of the print to be made. In order that the roller 66 will be maintained in its position of adjustment, the sleeve 63 is provided with a plurality of grooves 69 adapted to receive the free end 70 of a spring 71 secured to a bracket 72 which also supports shafts 29, 57 and 64, as shown in Fig. 3. Thus the roller 66 may be moved to adjusted position to register with the proper row of pins 62 and is then securely but yieldably held in its adjusted position.

Figure 5:
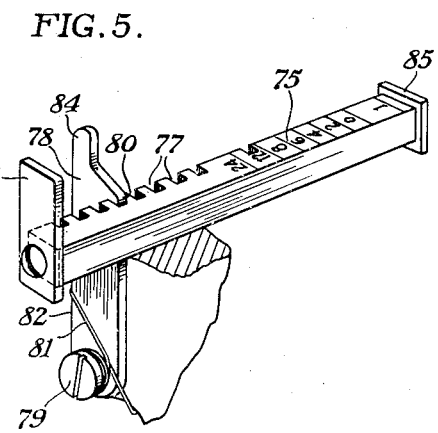
Fig. 5 is a perspective view of a portion of the control device illustrated in Fig. 4, showing the presetting device and its holding means.

In order to facilitate rapid and accurate adjustment of the roller 66, the present invention provides a presetting device, the setting of which determines the adjustment of the roller 66. This presetting device is shown in Fig. 5, and comprises a bar 75 slidably mounted on bracket 72 and having one edge thereof provided with a series of notches 77 spaced to correspond with the spacing of the pins 62 on drum 40. A locking member 78 has the lower end pivoted at 79 on bracket 72 and the upper end 80 arranged to engage in the notches 77, as shown in Fig. 5. A spring 81 is wrapped around the pivot 79 and has one end hooked over the edge 82 of the member 78 to urge the latter towards the bar 75 to move the edge 80 into locking relation with the notches 77, as is apparent from inspection of Fig. 5. The bar 75 is preferably provided with a scale 83 corresponding with the scale 68 on the shaft 64. The scale 85 may cooperate with a suitable pointer or mark, not shown.

The upper end of bar 78 is provided with a finger-piece 84 by which the bar may be moved to the left, as viewed in Fig. 5, against the action of the spring 81, to withdraw the edge 80 out of notches 77 to free the bar 75. The latter may now be moved axially to adjust it for the desired number of prints to be made. If, for example, six prints are to be made, the bar 75 is adjusted to the position shown in Fig. 5 to bring the notch corresponding to six prints into registry with the edge 80 of the member 78. The latter is then released and the spring 81 moves the edge 80 into the notch 77 for six prints. This adjustment may be made while the machine is in operation and prior to the time when the change is to be made. In order that the setting of the bar 75 may be quickly and easily transformed to the roller 66, the left end of the bar 75 is provided with an upstanding finger-piece 85. The sleeve 63 is provided with a similar finger-piece 86. These finger-pieces serve to quickly adjust the sleeve 63 and hence the roller 66, in accordance with the setting of the bar 75. To secure this result, the bar 75 is first positioned, as shown in Fig. 5. If the previous setting of the sleeve 63 was for a different number of prints, the finger-pieces 85 and 86 will be out of registry, as shown in Fig. 4. Now to bring the sleeve 63 into adjustment in accordance with the setting of bar 75, the finger-pieces 85 and 86 are gripped between the thumb and forefinger and pressed towards each other to bring the finger-pieces into exact registry, as shown in Fig. 3. This movement serves to quickly bring the sleeve 63 and roller 66 into the adjustment set on the bar 75, and this adjustment can be made quickly and easily while the machine is in operation and without altering the timed relation of the projector and camera, the advantages of which are apparent.

Thus by moving the roller 66 in accordance with the selected setting of the bar 75, the desired number of prints may be made in the duplicate of an image area of the original. The number of prints to be made is under the control of the operator and different numbers of prints may be made of different image areas merely by changing the position of the roller 66. If, however, the bar 75 and the sleeve 63 are adjusted to the O position, the roller 66 will be moved to a position on the roller indicated by the number 89. At this point, there are no pins 62 on the drum so that the pawl and ratchet will be rendered inoperative. This adjustment is used when it is desired to run the camera alone, such as when winding unexposed film into the gate to start a run, or after winding exposed film into the camera magazine at the end of the run. If, however, a single print is to be made of the image area of the original, as in ordinary printing, the bar 75 and the pins 63 are moved to their extreme left position, as viewed in Fig. 3. This movement serves to bring the roller 66 up onto a ridge 90 formed on the left end of the drum 40, as shown in Figs. 3 and 7. In this position, the roller 66 serves to hold the plate 56 in its elevated position to free the disk 50. The projector and camera are then directly connected so as to operate continuously to intermittently move the original and duplicate film through the projector and camera, respectively, to make a single print on the duplicate film of each image area of the original, as is apparent.

The present invention thus provides a printer having a control mechanism which permits the making of a pre-selected number of consecutive frames or prints of a single image area of the original film on the duplicate. Also, the number of prints of different image areas may be varied over a wide range. The control device is simple, of rugged construction, easy to adjust and operate, and highly effective in its results.

While one embodiment of the invention has been disclosed, it is to be understood that the inventive idea may be carried out in a number of ways. This application is, therefore, not to be limited to the precise details disclosed, but is intended to cover all variations and modifications thereof, falling within the scope of the appended claims.

I claim:

1. In a photographic printing apparatus, the combination with a projector through which image areas are adapted to be moved intermittently to bring successive areas into position for projection, drive means for moving said areas, a camera having a film strip adapted to be moved intermittently through the path of the projected areas to form prints thereof, drive means for moving said strip, of an adjustable control device connecting said drives for controlling to movement of said first drive means in a selected timed relation to said second drive means to regulate the number of prints formed from an image area, said control device comprising a clutch having a pivoted member, a rockable member for moving said pivoted member, a rotatable member operatively connected to and actuated by said second drive means, and means carried by said rotatable member for varying the time of operation of said rockable member to impart a periodic operation to said first drive means in timed relation to the movement of said film strip through said camera.

2. In a photographic printing apparatus, the combination with a projector through which image areas are adapted to be moved intermittently to bring successive areas into position for projection, drive means for moving said areas, a camera having a film strip adapted to be moved intermittently through the path of the projected areas to form prints thereof, drive means for moving said strip, of an adjustable control device connecting said drive for controlling to movement of said first drive means in a selected timed relation to said second drive means to regulate the number of prints formed from an image area, said control device comprising a clutch having a pivoted member, a rockable member for moving said pivoted member, a rotatable member operatively connected to and actuated by said second drive means, means carried by said rotatable member for varying the time of operation of said rockable member to impart a periodic operation to said first drive means in timed relation to the movement of said film strip through said camera, and a presetting device for adjusting the position of said rockable member relative to said rotatable member to vary the frequency of actuation of said pivoted member to control the movement of said areas relative to said strip.

3. In a photographic printing apparatus, the combination with a projector through which image areas are adapted to be moved intermittently to bring successive areas into position for projection, drive means for moving said areas, a camera having a film strip adapted to be moved intermittently through the path of the projected areas to form prints thereof, drive means for moving said strip, of an adjustable control device connecting said drive for controlling to movement of said first drive means in a selected timed relation to said second drive means to regulate the number of prints formed from an image area, said control device comprising a clutch having a pivoted member, a rotatable member operatively connected to and driven by said second drive means, rows of differently spaced pins carried by said rotatable member, a roller adapted to engage said pins and to be moved thereby into engagement with said pivoted member to actuate the latter to operate said clutch to connect said first and second drive means whereby the movement of said areas will be in timed relation to the movement of said strip, and means for mounting said roller for movement into engagement with a selected row of pins to control the frequency of operation of said clutch to regulate the number of prints made.

4. In a photographic printing apparatus, the combination with a projector through which image areas are adapted to be moved intermittently to bring successive areas into position for projection, drive means for moving said areas, a camera having a film strip adapted to be moved intermittently through the path of the projected areas to form prints thereof, drive means for moving said strip, of an adjustable control device connecting said drive for controlling to movement of said first drive means in a selected timed relation to said second drive means to regulate the number of prints formed from an image area, said control device comprising a clutch having a pivoted member, a rotatable member operatively connected to and driven by said second drive means, rows of differently spaced pins carried by said rotatable member, a roller adapted to engage said pins and to be moved thereby into engagement with said pivoted member to actuate the latter to operate said clutch to connect said first and second drive means whereby the movement of said areas will be in timed relation to the movement of said strip, means for mounting said roller for movement into engagement with a selected row of pins to control the frequency of operation of said clutch to regulate the number of prints made, a presetting selector for indicating the number of prints to be made, and means for adjusting said roller in accordance with the setting of said selector.

5. In a photographic printing apparatus, the combination with a projector through which image areas are adapted to be moved intermittently to bring successive areas into position for projection, drive means for moving said areas, a camera having a film strip adapted to be moved intermittently through the path of the projected areas to form prints thereof, drive means for moving said strip, of an adjustable control device connecting said drive for controlling to movement of said first drive means in a selected timed relation to said second drive means to regulate the number of prints formed from an image area, said control device comprising a clutch having a pivoted releasing member, a drum operatively connected to and driven from said second drive means, rows of pins carried by said drums, the pins in each row being differently spaced around the periphery of said drum, a rockable sleeve member movable across said drum, means for retaining said sleeve in any position of adjustment relative to said drum, a roller carried by said sleeve and adapted to engage said rows of pins and to be moved thereby into engagement with said rockable member to move the latter to engage said clutch to connect said drive means to move said areas in timed relation to the movement of said film strip, a slidable presetting device positioned adjacent said sleeve, and cooperating means carried by said sleeve and said device to adjust said roller to move the latter into engagement with a preselected row of pins to control the frequency of operation of said clutch to vary selectively the movement of said areas relative to said film strip.

EDWIN C. FRITTS.

REFERENCES CITED

The following references are of record in the file of this patent:

UNITED STATES PATENTS

| Number | Name | Date |
| --- | --- | --- |
| 1,204,098 | Watson | Nov. 7, 1916 |
| 1,919,433 | Hutchings | July 25, 1933 |
| 2,001,596 | Caps et al. | May 14, 1935 |

Patent No. 2,478,384

Certificate of Correction

August 9, 1949

EDWIN C. FRITTS

It is hereby certified that errors appear in the printed specification of the above numbered patent requiring correction as follows:

Column 2, line 30, for the words "a very" read *every*; column 6, line 40, for "transformed" read *transferred*;

and that the said Letters Patent should be read with these corrections therein that the same may conform to the record of the case in the Patent Office.

Signed and sealed this 13th day of December, A. D. 1949.

[SEAL]

THOMAS F. MURPHY,
*Assistant Commissioner of Patents.*